Figure 1:
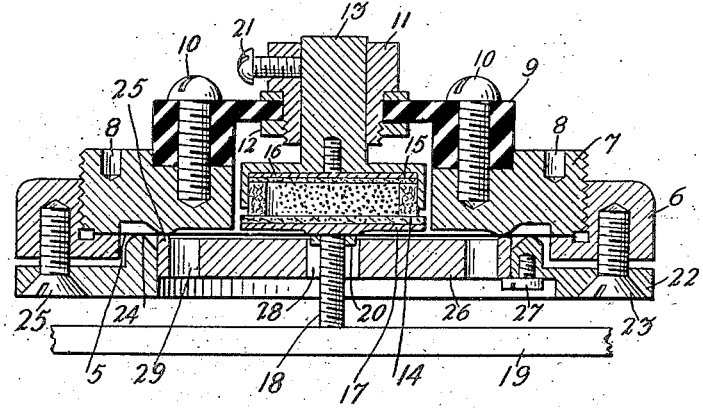

Aug. 7, 1923.

J. P. MAXFIELD

VIBRATION DETECTOR

Filed April 25, 1919    2 Sheets-Sheet 1

Inventor:
Joseph P. Maxfield.
by J. E. Roberts  Atty.

Aug. 7, 1923.
J. P. MAXFIELD
1,463,830
VIBRATION DETECTOR
Filed April 25, 1919
2 Sheets-Sheet 2
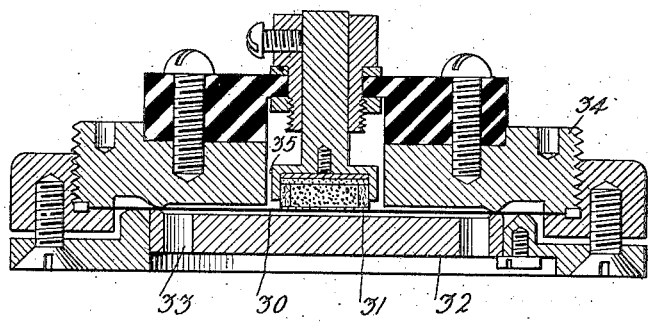
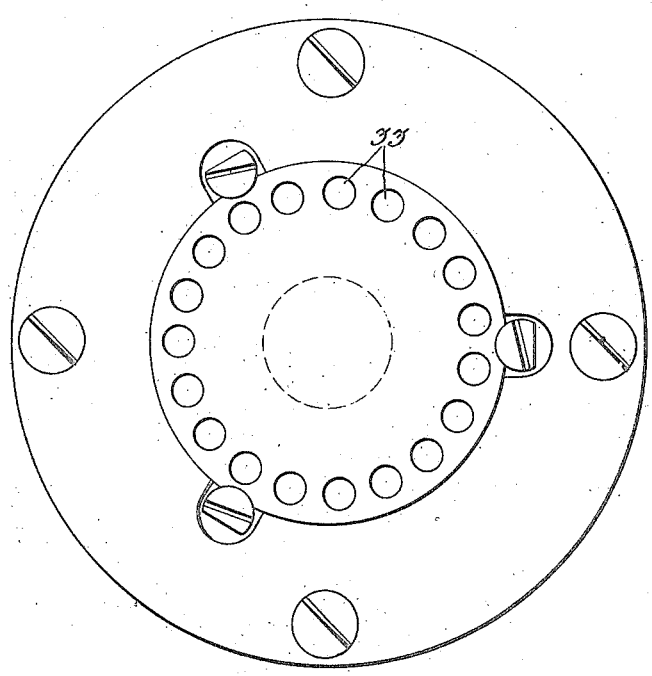
Inventor:
Joseph P. Maxfield.
by J. G. Roberts
Att'y.

Patented Aug. 7, 1923.

1,463,830

UNITED STATES PATENT OFFICE.

JOSEPH P. MAXFIELD, OF MILLBURN, NEW JERSEY, ASSIGNOR TO WESTERN ELECTRIC COMPANY, INCORPORATED, OF NEW YORK, N. Y., A CORPORATION OF NEW YORK.

VIBRATION DETECTOR.

Application filed April 25, 1919. Serial No. 292,533.

*To all whom it may concern:*

Be it known that I, JOSEPH P. MAXFIELD, a citizen of the United States, residing at Millburn, in the county of Essex, State of New Jersey, have invented certain new and useful Improvements in Vibration Detectors, of which the following is a full, clear, concise, and exact description.

This invention relates to a vibration detector and more particularly to a device of this character for converting the effect of sound waves and similar vibrations into current variations in an electrical circuit.

More particularly, the invention relates to the moving system of a device of this character and to a means for damping the movement of such a system to eliminate the effects of resonance in case the system is subjected to vibrations at or near its natural frequency.

A familiar example of this type of device is the ordinary telephone transmitter, although these devices have other applications such, for example, as the detection of very feeble or distant sources of sound or vibrations.

In such a device the sound vibrations are caused to set in vibration a sound-responsive body, usually a diaphragm, the vibration of which is utilized to cause relative movement between two members forming part of a current-responsive device. This relative movement may be used to vary either the inductance, the capacity or the resistance of an electrical circuit, and in this way the amount of current flow in the circuit.

The present invention is more particularly concerned with the construction and arrangement of the moving system of such a device, and is entirely independent of the particular means employed to convert this movement into current variations.

The moving system of a device of this type has a certain frequency known as its natural frequency, depending upon its mass, stiffness and friction, so that when vibrations approximating its natural frequency are imposed upon it, resonance takes place and introduces a factor which causes distortion both by introducing an increase in response and by adding transients in the reproduction in the electrical circuit of the effect of the impressed sound vibrations. This resonant effect has long been known and it has been proposed to remedy it by removing the natural frequency of the device from the troublesome frequency range and by damping the vibrating system by decreasing its mass and by adding friction. The natural frequency of the vibrating system is increased by means of damping, and in some constructions this damping effect is brought about by providing a restricted passage through which a thin film of air must be forced when the system vibrates, in which case the structure is said to be air-damped. A further increase in the natural frequency of the device is brought about by stretching the diaphragm.

It is the object of the present invention to provide an improved air-damped vibration detector in which sufficient damping is brought about without sacrificing efficiency in converting vibrations into current variations in the electrical circuit. In accordance with this invention, the moving system of the device is supported on a diaphragm of considerable area, which is arranged to vibrate between two surfaces separated from but very close to each other, so that the air included between these surfaces and the diaphragm is set in motion by the vibration of the diaphragm, and due to the friction of the air and its viscosity, the moving system is efficiently damped. Effective damping has been obtained where the film of air between these surfaces was of the order of 0.015 inch.

In accordance with another feature of this invention, one of the damping surfaces includes a member forming a part of the current-varying element which is mounted on the diaphragm itself.

Figure 2:
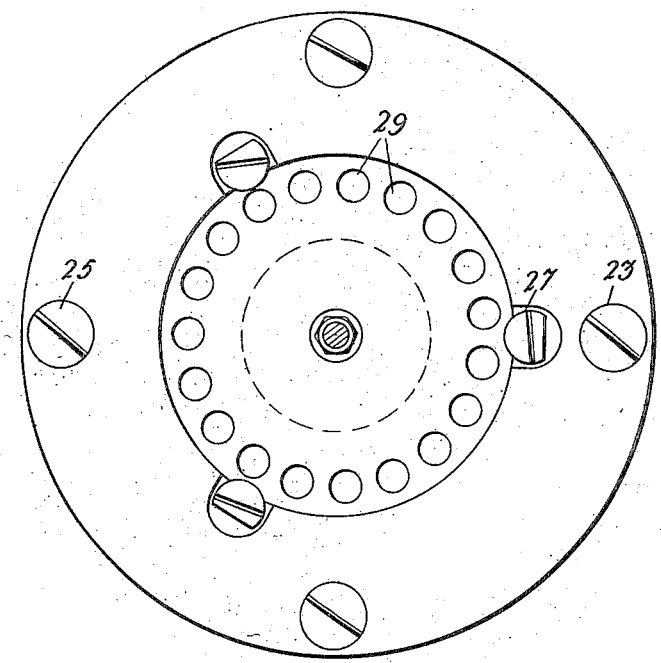

These and other features of the invention not specifically pointed out will appear from the following specification and the accompanying drawings, in which Fig. 1 is a sectional view of an acoustic device in accordance with one embodiment of the invention; Fig. 2 is a plan view of the same; Fig. 3 is a sectional view of a modified type more particularly adapted to be used as a telephone transmitter; and Fig. 4 is a plan view of the structure shown in Fig. 3.

In the device shown in Figs. 1 and 2 the diaphragm 5 is clamped between the clamping ring 6 and the rear damping plate 7, these parts being adapted to be screwed together as shown, and the damping plate 7 being provided with recesses 8—8 which are adapted to receive the lugs of a suitable spanner wrench. A bridge member 9 of an insulating material, such as micarta, is secured to the plate 7 by means of the screws 10—10, and is provided with a central opening adapted to receive the thimble 11 which is held in place by means of the nut 12 threaded on the lower portion of the thimble as shown and bearing against the lower surface of bridge member 9. This bridge member does not serve to inclose the rear portion of the device but is only made of sufficient width to support the thimble 11 and the parts associated therewith. Extending through the thimble 11 is the stem 13 of a common type of transmitter button comprising a front electrode 14 and a back electrode 15 with the intervening space partially filled with a resistance-varying material such as granular carbon. The back electrode 15, preferably of carbon, is soldered or otherwise fastened to an electrode holder 16 which is provided with a threaded stud to permit it being secured to the stem 13. The front electrode is also soldered or otherwise fastened to a holder 17 having a threaded stud 18 to which is secured the sound responsive body or diaphragm 19. The button is securely clamped to the diaphragm 5 by means of the nut 20 threaded on the stud 18 and is prevented from bodily movement by the set screw 21 which threads into the thimble 11 and engages the stem 13. Upon the diaphragm 5 being rigidly clamped at its periphery between clamping ring 6 and rear damping plate 7, the transmitter front plate 22 is secured in position by means of the screws 23—23 which thread into the clamping ring 6. This front plate is provided with a projecting portion 24 which bears against the diaphragm and stretches it evenly over the projecting ring 25 formed on the rear damping plate. The front damping plate 26 is provided with a flange at its periphery which is adapted to bear against the diaphragm in alignment with the ring portion 25 of the rear damping plate. The front damping plate 26 is held in place by means of the screws 27—27 threading into the front plate 22, the heads of these screws having a portion removed as shown in order that they may be utilized to clamp the two parts together, and when desired, may be turned in such a way as to permit the removal of the plate. The inner surface of plate 26 is very accurately ground so that the thickness of the plate at the flange portion is only a few thousandths of an inch in excess of the thickness of the central portion of the plate, thus defining the thickness of the air chamber between the plate and the diaphragm. This plate is provided with a central opening 28 to permit the entrance of stud 18 and nut 20, and with a plurality of openings 29.

With this construction the movement of the diaphragm is damped against movement in either direction by a thin layer of air. Inward movement of the diaphragm is retarded by means of the film of air between the diaphragm and rear damping plate 7, and also to a lesser degree by the film of air between the diaphragm and the holding plate 17 of the front electrode. Outward movement of the diaphragm is retarded by means of a thin film of air extending between the diaphragm and the front damping plate 26. In neither case is this film of air confined, free circulation being provided in front of the diaphragm by means of the openings 29, while at the rear of the diaphragm an exit is provided between the transmitter button and the inner wall of plate 7, thus damping the diaphragm substantially equally in both directions.

In this structure, which is of the inertia type, the parts are made of considerable mass so that vibrations set up in the sound responsive body 19 are transmitted with an appreciable lag, thereby permitting relative movement between the front and rear electrodes and the consequent change in resistance of the current varying device. The front damping plate 26 and the front plate 22 are preferably so proportioned as to bring the center of mass of the device in alignment with the diaphragm 5.

On Figs. 3 and 4 of the drawing there is shown a modified structure adapted to be used more particularly as a transmitter. In this structure the method of clamping and stretching the diaphragm and the method of supporting the transmitter button are the same as described in connection with the preceding figures. However, in this case, the diaphragm itself is used as the front electrode of the button, a suitable portion 30 being gold plated where it comes in contact with the carbon granules. A ring 31 of felt or other suitable material is shellacked to the inner wall of the shell 35 to act as a retaining wall for the carbon. The front damping plate 32 is provided with a circular series of holes 33 to permit the free circulation of air, but in this case no central opening is required. Inward movement of the diaphragm is damped by means of a thin layer of air existing between the diaphragm and the rear damping plate 34, while outward movement of the diaphragm is damped by means of a thin layer of air between the diaphragm and the front damping plate 32.

With the structures illustrated and described not only has it been found possible to attain high efficiency in detecting feeble vibrations, but where the device is used for transmitting speech, the lack of resonance within the range of voice currents results in a very decided improvement in the quality of the transmission.

Obviously, the arrangement of using the diaphragm itself for the front electrode, as shown on Fig. 3, could be used equally well in connection with the structure illustrated in Fig. 1 and conversely the current ranging device of Fig. 1 could be used on the structure illustrated by Fig. 3.

What is claimed is:

1. A vibration detector comprising a diaphragm responsive to vibrations, a current-varying device operably connected thereto, and a damping plate on either side of the diaphragm and separated therefrom by a thin film of air, said film of air not to be more than 0.015 inch in depth.

2. An acoustic device comprising a diaphragm responsive to mechanical vibrations, a damping plate located on either side of the diaphragm and in such close face to face relation thereto that the lowest natural frequency of the device is outside of the range of useful voice currents.

3. A telephone transmitter comprising a diaphragm responsive to sound waves, a current-varying device associated therewith, means for clamping the diaphragm at its periphery, means for stretching the diaphragm to increase its natural period, and means on either side of the diaphragm for further increasing its natural period.

4. A telephone transmitter comprising a diaphragm responsive to sound waves, a current-varying device associated therewith, means for clamping the diaphragm at its periphery, means for stretching the diaphragm to increase its natural period, and means on either side of the diaphragm for damping its movement.

5. A vibration detector comprising a body responsive to vibrations and a current-varying device including a part fixed to the vibration-responsive device, an inertia member movable relative thereto, and means for supporting said inertia member from the vibration-responsive body, said means including a thin stretched diaphragm.

6. An acoustic device comprising a body responsive to vibrations and a current-varying device including a part fixed to the vibration-responsive device, an inertia member movable relative thereto, and means for supporting said inertia member from the vibration-responsive body, said means including a diaphragm damped on either side.

In witness whereof, I hereunto subscribe my name this 23rd day of April A. D., 1919.

JOSEPH P. MAXFIELD.